United States Patent

Wei et al.

Patent Number: 5,849,837
Date of Patent: Dec. 15, 1998

[54] STRUCTURED REACTIVE LATEX

[75] Inventors: Yi Wei, White Bear Lake; Wayne P. Miller, Mounds View; Catherine A. Wenz, Minneapolis, all of Minn.

[73] Assignee: H. B. Fuller Licensing & Financing, Inc., St. Paul, Minn.

[21] Appl. No.: 949,275

[22] Filed: Oct. 13, 1997

Related U.S. Application Data

[63] Continuation of Ser. No. 651,631, May 22, 1996, abandoned.

[51] Int. Cl.$^6$ ...................................................... C08L 33/00
[52] U.S. Cl. ........................ 524/813; 523/201; 524/458; 524/460; 524/533; 524/535; 524/555
[58] Field of Search ............................. 523/201; 524/460, 524/813, 507, 458, 533, 535, 555

[56] References Cited

U.S. PATENT DOCUMENTS

| | | | |
|---|---|---|---|
| 3,290,350 | 12/1966 | Hoover | 260/453 |
| 3,502,475 | 3/1970 | Kane | 96/87 |
| 4,070,323 | 1/1978 | Vanderhoff et al. | 524/813 X |
| 4,101,491 | 7/1978 | Tucker | 524/813 |
| 4,310,398 | 1/1982 | Gimpel et al. | 524/813 X |
| 4,439,616 | 3/1984 | Singh et al. | 560/25 |
| 4,514,552 | 4/1985 | Shay et al. | 524/813 X |
| 4,608,314 | 8/1986 | Turpin et al. | 524/813 X |
| 5,013,787 | 5/1991 | Barron et al. | 524/813 X |
| 5,030,507 | 7/1991 | Mudge et al. | 524/813 X |
| 5,066,710 | 11/1991 | Simonet et al. | 524/813 X |
| 5,171,764 | 12/1992 | Katayama et al. | 523/201 |
| 5,219,900 | 6/1993 | Davies et al. | 524/458 X |
| 5,314,964 | 5/1994 | Lucas | 524/458 X |
| 5,494,980 | 2/1996 | Buter et al. | 523/201 X |
| 5,525,666 | 6/1996 | Hoenel et al. | 524/458 |

FOREIGN PATENT DOCUMENTS

| | | | |
|---|---|---|---|
| 0113593 | 9/1975 | Japan | 524/813 |

*Primary Examiner*—Judy M. Reddick
*Attorney, Agent, or Firm*—Nancy N. Quan

[57] ABSTRACT

A latex comprising a free radically polymerized product, said product comprising at least two ethylenically unsaturated monomers, at least one of said monomers having an isocyanate group which is sterically hindered or blocked and at least one other of said ethylenically unsaturated monomers being free of isocyanate functional groups, in an aqueous emulsion in the presence of a free-radical polymerization catalyst, in a manner such that the sterically hindered or blocked isocyanate groups distribute in the outer layer of the latex particle and the method of making such.

24 Claims, 2 Drawing Sheets

WAVE NUMBER (cm⁻¹)

WAVE NUMBER (cm⁻¹)

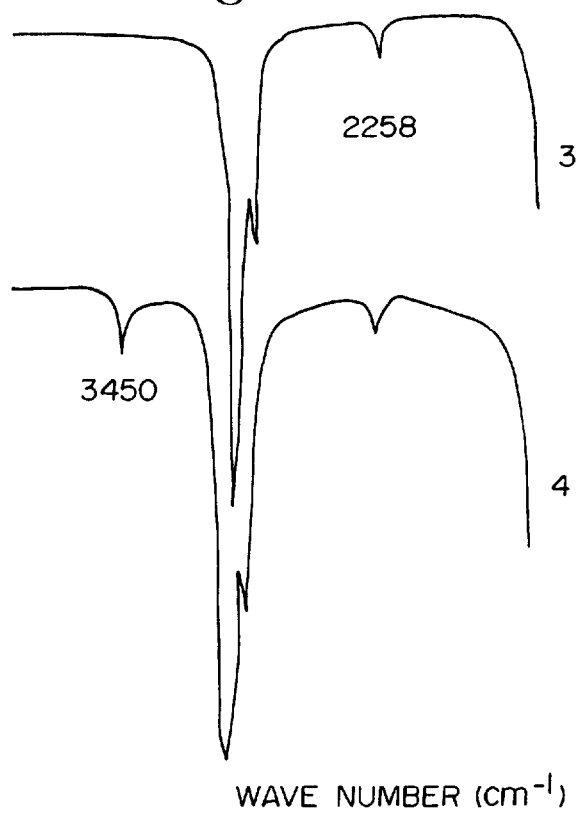

STRUCTURED REACTIVE LATEX

This application is a continuation of application Ser. No. 08/651,631, filed May 22, 1996, now abandoned.

FIELD OF THE INVENTION

The present invention relates to the copolymerizing of ethylenically unsaturated monomers with a mono unsaturated isocyanate via emulsion polymerization so that the sterically hindered or blocked isocyanate groups are distributed, generally, in the outer layer of the latex particles.

BACKGROUND OF THE INVENTION

In U.S. Pat. No. 4,439,616, there is disclosed a method for producing tertiary alkyl isocyanates, such as tetramethylxylylene diisocyanates (TMXDI), by thermal cracking of corresponding urethanes formed by addition of corresponding olefins and carbamic acid esters at moderate temperatures and in the presence of acid catalyst. Such process is particularly useful for producing the meta- and para-isomers of TMXDI and as the by-product thereof, substantial amounts of the corresponding vinyl isocyanate meta- or para-isomers, viz., meta-isopropenyl-$\alpha,\alpha$-dimethylbenylisocyanate (m-TMI), respectively, are formed.

The meta-TMI or para-TMI by-products in such systems may be recycled within the process to improve the over-all yield of TMXDI therein, but such by-products have substantial utility per se as separate products due to their difunctional character, i.e., the presence of reactive isocyanate (—NCO) and vinyl groups. Thus, TMI may be homo- or co-polymerized to form polymers with isocyanate functionality which are cross-linkable with curatives containing a difunctional or polyfunctional amino or hydroxyl compound. Such cross-linkable compositions have film-forming properties and advantageously may be used for coatings, for example, on metal, wood and glass substrates, as well as having potential applicability for production of molded articles, such as by reaction injection molding (RIM).

U.S. Pat. No. 3,290,350 discloses copolymerization of TMI by conventional methods using known addition polymerization initiators, such as those of the free radical type, e.g., persulfate, peroxy and azo initiators.

In U.S. Pat. No. 3,502,475, there is disclosed a method of forming a coating on polyolefin and polyester films, by application thereto of an aqueous dispersion of a copolymer of from about 1 to about 50 percent by weight of meta- or para-TMI.

The prior art teaches the art of making free or blocked isocyanate functional latexes of ethylenically unsaturated monomers which is conducted through conventional batch or semi-batch emulsion polymerization, and an uniform particle morphology is obtained. The functional groups which are buried inside the particles generally do not contribute to the surface reaction or crosslink where adhesion between surfaces are more important. For example, for the sizing of fiber glass, the adhesion between the sizing agent and the fiber is critical for both strand integrity and high composite strength.

Accordingly, it is an object of the invention to copolymerize the ethylenically unsaturated monomers with an unsaturated isocyanate monomer via a two-stage or one-stage seed emulsion polymerization.

Another object of the invention is to provide an isocyanate (NCO) distribution that generally is close to the surface of the emulsion polymer particles.

Other objects and advantages of the invention will be apparent from the ensuing disclosure and appended claims.

SUMMARY OF THE INVENTION

The present invention relates to a latex comprising a free radically polymerized product in the presence of a catalyst, said product comprising at least two ethylenically unsaturated monomers, at leas one of said monomers being free of isocyanate functional groups and at least one of said monomers having an unsaturated isocyanate group which is sterically hindered or blocked, said latex comprising particles having a morphology with the isocyanate containing polymer being predominately located on the surface layer of said particle.

Suitable unsaturated monomers having a sterically hindered isocyanate group include dimethyl meta- or para-isopropenyl benyl isocyanate (TMI). Other suitable unsaturated monomers having a blocked isocyanate group include acetone oxime blocked allyl isocyanate. Other isocyanates such as TDI, MDI, HDI, HMDI, TMXDI and IPDI can be reacted with hydroxy, carboxy and amines containing ethylenically unsaturated monomers to produce a reaction product of the unsaturated isocyanates. This reaction product can further be blocked to be used in the present invention. Suitable unsaturated monomers free of isocyanate functional groups include esters of acrylic or methacrylic acid, vinyl acetate and styrene.

The present invention further relates to a method of making a latex comprising polymer at least two ethylenically unsaturated monomers, at least one of said monomers having an isocyanate group which is sterically hindered or blocked and at least one other of said ethylenically unsaturated monomers being free of isocyanate functional groups, in an aqueous emulsion in the presence of a free-radical polymerization catalyst, in a manner such that the sterically hindered or blocked isocyanate groups distribute in the outer layer of the latex particle.

The present invention can be carried out in a one-stage or a two-stage seed emulsion polymerization process. In the process of copolymerizing the unsaturated monomers via seed emulsion polymerization, other optional ingredients such as defoamers, preservatives, pH adjusters, reducing agents and chain transfer agents can generally be used to adjust final properties. For example, polymerization conducted at pH less than 7 and using the redox initiator system enables the reaction at low temperature, so that less —NCO groups are lost during the polymerization process.

The emulsion can be used in applications such as fiber glass sizing and as a coating or adhesive on various substrates when properties such as increased adhesive strength and good composite strengths are important.

BRIEF DESCRIPTION OF THE DRAWINGS

FIG. 2 and FIG. 3 show the reaction of the isocyanate with Jeffamine ED-600, a diamine by Huntsman Corp., (Salt Lake City, Utah). Films used for testing were cast from the mixture listed in Table IV.

FIG. 2 shows the structured latex made from the current invention is further crosslinked, in contrast with the conventional latex, which is shown in FIG. 3.

BRIEF DESCRIPTION OF THE INVENTION

Figure 1:
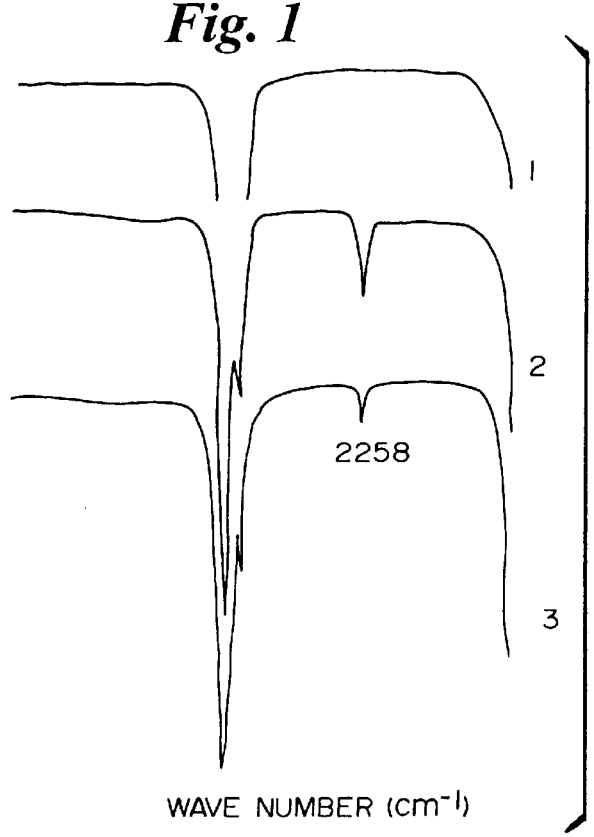
FIG. 1 shows the characteristic IR peaks corresponding to isocyanate groups in different latex films, given in Table III. It is shown by this figure that the conventional process caused significant loss in isocyanate groups.

The unsaturated isocyanate used in the present invention generally contains one or more carbon-carbon double bond and is a sterically hindered or blocked isocyanate. Generally, the steric hindrance or blockage reduces the reactivity of the isocyanate group with water so as to survive from the polymerization process and the storage period. Typically, this unsaturated isocyanate is TMI and preferably it is meta TMI, by Cytec Industries, Inc., (West Paterson, N.J.). A preferred amount used in the present invention is about 0.1–20.0 wt-% of the total monomer weight, more preferably in an amount of about 1.0–10.0 wt-% of the total monomer weight and most preferably in an amount of about 3.0–5.0 wt-% of the total monomer weight. An example of the sterically hindered unsaturated isocyanate is meta TMI, and an example of the blocked unsaturated isocyanate is the acetone oxime blocked allyl isocyanate. Other isocyanates such as TDI, MDI, HDI, HMDI, TMXDI and IPDI can be reacted with hydroxy, carboxy and amines containing ethylenically unsaturated monomers to produce a reaction product of the unsaturated isocyanates. This reaction product can further be blocked to be used in the present invention.

The ethylenically unsaturated monomers co-polymerizable with the unsaturated isocyanate include $C_1$–$C_8$ alkyl acrylate and methacrylate, styrene, acrylonitrile, vinyl acetate and combinations thereof. The preferred combination of monomers are those that give a Tg, as measured by a DSC at the rate of 10° C. per minute, of about −50° to about 85° C. The preferred amount of the ethylenically unsaturated comonomers used in the present invention is about 20–60 wt-% of the latex, more preferred amounts of about 40–50 wt-% of the latex and most preferably in an amount of about 45 wt-% of the latex.

The free radical source may be thermal or redox systems. The preferred systems include azo compounds, hydroperoxide, persulfates and/or, in combination with salts of formaldehyde, sulfoxylate, bisulfite and erythorbic acid. The preferred amount is about 0.1–1.0 wt-% of the total monomer weight with a more preferred amount of about 0.1–0.5 wt-% and most preferably an amount of about 0.2–0.4 wt-%.

Chain transfer agents may be added to adjust the molecular weight of the emulsion polymers. They may be water soluble or oil soluble mercaptans or thiols. The preferred chain transfer agent is a normal or tertiary dodecyl mercaptans in a preferred amount of about 0.01–5.0 wt-% based on the total monomer weight, with a more preferred amount of about 0.01–2.0 wt-% based on the total monomer weight and most preferably in an amount of about 0.1–0.5 wt-% based on the total monomer weight.

The emulsifiers that may be present in the present invention may be ionic, nonionic, as well as polymeric, and mixtures thereof. The preferred composition includes alkyl polyethoxyethanol in an amount of about 0.5–5.0 wt-% of the total monomer weight, more preferably in an amount of about 0.5–3.0 wt-% of the total monomer weight and most preferably in an amount of about 1.0–2.0 wt-% of the total monomer weight.

The polymerization of the present invention is either a one-staged or a two-staged seed emulsion polymerization. In the one-stage seed process, heterogeneous latex particle morphology is obtained by forming the seed in situ followed by the polymerization of TMI. An example of the one-stage process is given in the following sequence of steps:

(1) forming an emulsion of the ethylenically unsaturated monomers in the presence of emulsifier(s);

(2) in a semi-batch, starved process polymerize the ethylenically unsaturated monomers to form a seed latex having average particle size about 0.05–0.5 microns.

(3) copolymerize TMI with or without other ethylenically unsaturated monomers on top of the pre-formed seed particles to further enlarge the particle and construct a surface layer composition different from the bulk composition.

In the two-staged seed process, a seed latex having no isocyanate functionality was present before the reaction and on which meta-TMI was polymerized again with or without other ethylenically unsaturated monomers.

Typically, the polymerization time of a one-stage process or two-stage process is about 2–5 hours. The resulting product may have particle size of about 0.1–1.0 microns, pH of about 2–5, viscosity of about 20–500 cps and solids of about 40–50%. The volume ratio of the bulk of the latex particle to the outer surface layer of the latex particle is preferably 5:95–99:1, more preferably 50:50–99:1 and most preferably 75:25–99:1. Generally, the latex contains particle sizes having morphologies ranging from a core and a surface layer which may or may not be continuous.

The preferred polymerization temperature is about 5°–80° C., and most preferably, a polymerization temperature of about 35°–65° C. is useful. The resulting product has sterically hindered or blocked isocyanate groups distributed in the surface layer of the latex particles so that an efficient interfacial crosslinking can be achieved.

It is critical in some systems to carry the polymerization in the right pH level or in the presence of transition metal ions, such as $Fe^{2+}$, to ensure the proper decomposition of the initiators. The preferred pH range is about 3–5 with a more preferred range of about 2–4. It is unique in the current invention that acetic acid was used to adjust the initial pH without using any salt form pH buffer. The intention of doing so is to obtain the desired pH level without negatively affecting the water resistance of the final product.

As one skilled in the art knows, functional groups buried inside the core of a latex particle are unable to achieve contact with the substrate surface or a post added crosslinking agent, especially when the particle is relatively large in size. Therefore, putting these reactive groups in the surface layer of the particle achieves a much higher efficiency of the interfacial crosslinking. In the current invention, this objective is achieved through the one-stage or two-stage emulsion polymerization process in which the distribution of the reactive isocyanate groups is controlled by the monomer feed schedule.

Copolymerizing the unsaturated isocyanate with other ethylenically unsaturated monomers introduces the reactive isocyanate groups into the copolymer. These isocyanate groups are capable of reacting with post added crosslinking agent containing, e.g., amine, hydroxyl or carboxyl, and/or with the functional groups on the surface of the substrate, so as to develop strong bonding or adhesion between the polymer and the substrate. Such a characteristic is appreciated by the applications where enhanced adhesion or compatibility are required, such as in surface coating adhesives.

The advantages of producing a latex made by the process of the present invention is demonstrated by an increase in its adhesive properties and the crosslinking efficiency of the reactive isocyanate groups. In fiber glass sizing for example, the reaction between the latex and the surface hydroxyl of the fiber glass creates good adhesion and thus good composite strength.

EXAMPLES

The following examples are offered to further illustrate the various aspects and attributes of the present invention. They are, however, not intended to limit the scope of the present invention.

Example I

The following example describes the one-stage seed process for the preparation of the structured reactive latex containing sterically hindered isocyanate groups:

The pre-emulsion (PE) was made by charging 80 grams of deionized water and 6.65 grams of T-Det O-407, a surfactant from Hacros, (Kansas City, Kans.), a defoamer and mixed for 15 minutes. Under agitation the mixture of 155 grams of methyl methacrylate from ICI Americas, Inc., (Wilmington, Del.), 155 grams of n-butyl acrylate from Hoechst Celanese Corp, (Somerville, N.J.) and 0.93 grams of n-dodecyl mercaptan from Elf Atochem (Philadelphia, Pa.) was added.

A jacketed reaction kettle was charged with 175 grams of deionized water and 0.1 grams of acetic acid. The reactor was placed under agitation and nitrogen purge. The temperature was raised to 60°–65° C. and 1 wt-% of the total pre-emulsion was started. The continuous feeding was started of the initiator solution containing 1.55 grams of t-butyl hydroperoxide from Aztec Chemicals, (Houston, Tex.) and 30 grams of deionized water, and the reducer solution containing 1.08 sodium formaldehyde sulfoxylate from Aldrich Chemical Co., Inc., (Milwaukee, Wis.) and 30 grams of deionized water. The system was reacted for 30 minutes before feeding the remaining pre-emulsion for 3 hours. Feeding started with 6 grams of m-TMI from Cytec, (W. Patterson, N.J.) with the last 10% of the pre-emulsion. When all feeds were completed, the system was held at the same temperature for another hour to allow the full converting of monomers. After tis the reactor was cooled and the latex filtered through 200 mesh.

Using a similar procedure other latexes in Table I were prepared.

Example II

(Comparative)

The following example prepares the copolymer latexes using the continuous uniform feed of all the monomers.

The pre-emulsion (PE) was made by charging 80 grams of deionized water and 6.65 grams of T-Det O-407, a surfactant from Harcros, Kansas City, Kans.), a defoamer and mixing for 15 minutes. Under agitation the mixture of 155 grams of methyl methacrylate from ICI Americas, Inc., (Wilmington, Del.), 155 grams of n-butyl acrylate from Hoechst Celanese Corp, (Somerville, N.J.), 6 grams of m-TMI from Cytec, (W. Patterson, N.J.), and 0.93 grams of n-dodecyl mercaptan from Elf Atochem, (Philadelphia, Pa.) was added.

A jacketed reaction kettle was charged with 175 grams of deionized water and 0.1 grams of acetic acid. The reactor was placed under agitation and nitrogen purge. The temperature was raised to 60°–65° C. and 1 wt-% of the total pre-emulsion was added. Continuous feeding of the initiator solution and reducer solution was started. The initiator solution contained 1.55 grams of t-butyl hydroperoxide from Aztec Chemicals, (Houston, Tex.), and 30 grams of deionized water, and the reducer solution contained 1.08 sodium formaldehyde sulfoxylate from Aldrich Chemical Co., Inc., (Milwaukee, Wis.) and 30 grams of deionized water. The system was left to react for 30 minutes before feeding the remaining pre-emulsion for 3 hours. After all feeds were completed, the system was held at the same temperature for another hour to allow the full converting of monomers. After this, the reactor was cooled and the latex filtered through 200 mesh.

Using a similar procedure other latexes in Table II were prepared.

Example III

The following example demonstrates, using FT-IR, the difference in crosslinking efficiency between the conventional latex in which the m-TMI is uniformly distributed in latex particles, and the structured latex in the current invention, in which the m-TMI is predominately distributed in the outer layer in latex particles.

FIG. 1 shows the characteristic IR peaks corresponding to isocyanate group as indicated by the absorption at 2258 $CM^{-1}$ in different latex films, given in Table III. It is shown by this figure that the conventional process caused significant loss in isocyanate groups.

Figure 2:
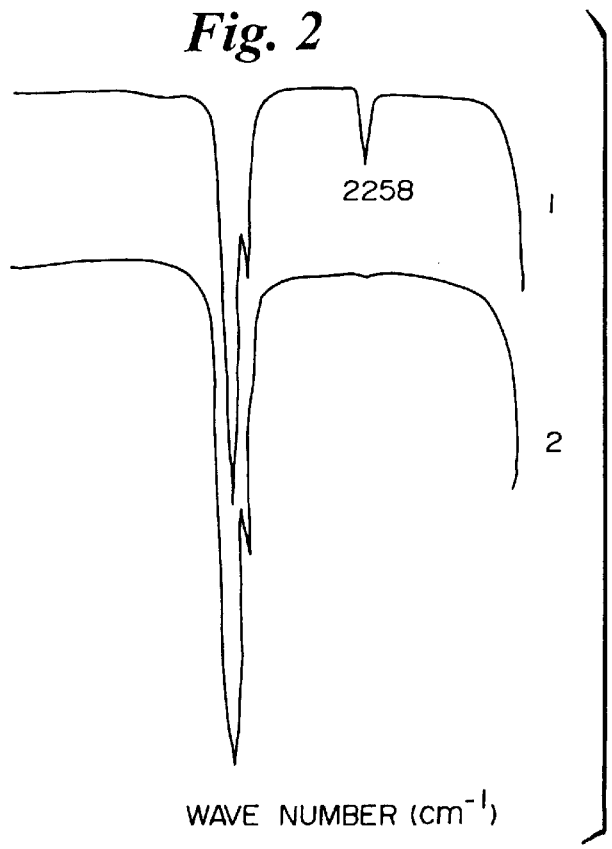

FIG. 2 and FIG. 3 show the reaction of the isocyanate with Jeffamine ED-600, a diamine ($-NH_2$ absorption at 3450 $CM^{-1}$) by Huntsman Corp., (Salt Lake City, Utah). Films used for testing were cast from the mixture listed in Table IV.

FIG. 2 shows the structured latex made from the current invention is further crosslinked, in contrast with the conventional latex, which is shown in FIG. 3.

Example IV

The following example describes the two-stage seed process for the preparation of the structured reactive latex containing sterically hindered isocyanate groups:

The pre-emulsion (PE) was made by charging 105 grams of deionized water and 11.18 grams of T-Det O-407, a surfactant from Harcros, (Kansas City, Kans.), a defoamer and mixed for 15 minutes. Under agitation the mixture of 98.8 grams of methyl methacrylate from ICI America's, Inc., (Wilmington, Del.), 130 grams of n-butyl acrylate from Hoehst Celanese Corp, (Somerville, N.J.), 13 grams of meta-TMI from Cytec, (W. Patterson, N.J.), and 5.2 grams of Monomer 238 from Sartomer Co., Inc., (West Chester, Pa.) was added.

A jacketed reaction kettle was charged with 577.2 grams of PN-3416-F latex from H. B. Fuller Co., (St. Paul, Minn.), which is a self-crosslinking acrylic latex, 270 grams of deionized water and 0.004 grams of ferrous sulfate. The reactor was placed under agitation and nitrogen purge. The temperature was raised to 60°–65° C. and continuous feeding began of pre-emulsion for 3 hours. Also fed was an initiator solution containing 0.39 grams of ammonium persulfate from Aldrich Chemical Co., (Milwaukee, Wis.) and 39 grams of deionized water, and a reducer solution containing 0.39 grams of sodium metabisulfite from Aldrich Chemical Co., (Milwaukee, Wis.), and 39 grams of deionized water. After all feeds were completed, the system was held at the same temperature for another hour to allow the full converting of monomers. After this the reactor was cooled and the latex filtered through 200 mesh.

Using a similar procedure other latexes in Table V were prepared.

Example V

To the samples prepared in and Example IV, different types and levels of post crosslinking agent may be added. In preparing the pre-crosslinked latexes, the crosslinking agent was added in deionized water dilution to the latexes in Example IV under agitation and room temperature. Table VI gives the examples of this kind of latexes.

TABLE I

| Sample No. | Composition in Weights | | | | | Solid Content (%) | pH | Number Average Particle Size (nm) | Maximum Tensile Stress (PSI) | Break Elongation (%) |
|---|---|---|---|---|---|---|---|---|---|---|
| | TMI | MMA | BA | GMA | MAA | | | | | |
| 1 | 0 | 155 | 155 | 0 | 0 | 43.0 | 2.45 | 460 | 848 | 1948 |
| 2 | 6 | 155 | 155 | 0 | 0 | 42.7 | 2.97 | 510 | 1567 | 1341 |
| 3 | 0 | 147 | 158 | 5 | 2.5 | 44.3 | 2.53 | 454 | 867 | 1479 |
| 4 | 6 | 147 | 158 | 5 | 2.5 | 45.0 | 4.49 | 367 | 1130 | 1229 |
| 5 | 6 | 147 | 158 | 5 | 0 | 44.7 | 3.95 | 457 | 726 | 2436 |

TABLE II

| Sample No. | Composition in Weights | | | | Solid Content (%) | pH | Number Average Particle Size (nm) | Maximum Tensile Stress (PSI) | Break Elongation (%) |
|---|---|---|---|---|---|---|---|---|---|
| | TMI | MMA | BA | GMA | | | | | |
| 1 | 6 | 155 | 155 | 0 | 43.3 | 2.85 | 492 | Continuous Film Not Formed | |
| 2 | 6 | 147 | 158 | 5 | 44.7 | 3.57 | 481 | 939 | 1957 |

TABLE III

| FIG. I IR Spectrum Nos. | TMI Content (Gram) | Polymerization Process | -NCO Distribution |
|---|---|---|---|
| 1 | 0 | — | — |
| 2 | 6 | Current Invention | Outer Layer of Particle |
| 3 | 6 | Conventional | Uniform Within Particle |

TABLE IV

| FIGS. II & III IR Spectrum Nos. | Composition | | Remarks |
|---|---|---|---|
| | Latex | Crosslinker | |
| 1 | Example I | — | Latex made in |
| 2 | Example I | ED-600 | Current Invention |
| 3 | Example II | — | Conventional |
| 4 | Example II | ED-600 | Latex |

TABLE V

| Sample No. | TMI Content in Shell Composition (%) | Core/Shell Weight Ratio | Reaction Temperature (°C.) | Number Average Particle Diameter (nm) | Maximum Tensile Strength (PSI) | Break Elongation (%) |
|---|---|---|---|---|---|---|
| 1 | 0 | 1:1 | 65 | 270 | 793 | 322 |
| 2 | 5 | 1:1 | 65 | 269 | 1143 | 208 |
| 3 | 10 | 1:1 | 65 | 271 | — | — |
| 4 | 5 | 1:2.5 | 65 | 304 | 1252 | 444 |
| 5 | 5 | 1:2.5 | 25 | 456 | — | — |
| 6 | 5 | 1:2.5 | 50 | 780 | — | — |

TABLE VI

| Sample No. | Polyamine (Jeffamine) | NCO/NH2 Molar Ratio | Maximum Tensile Strength (PSI) | Break Elongation (%) |
|---|---|---|---|---|
| 1 | — | — | 1143 | 1208 |
| 2 | T-403 | 1:0.7 | 1267 | 1170 |
| 3 | T-3000 | " | 1477 | 1239 |
| 4 | T-5000 | " | 1026 | 1249 |
| 5 | ED-600 | " | 1656 | 1211 |
| 6 | ED-900 | " | 1450 | 1242 |
| 7 | ED-2001 | " | 1120 | 1232 |

We claim:

1. A method for the preparation of a structured reactive latex particle comprising the steps of:
   a) providing an aqueous polymer emulsion comprising bulk core particles being free of isocyanate groups wherein said emulsion in a semi-batch starved process comprises the free radical addition polymerization of:
      i) at least one ethylenically unsaturated monomer free of isocyanates;
      ii) at least one emulsifying agent; and
      iii) at least one free radical initiator;
      to form a seed particle latex;
   b) copolymerzing at least one ethylenically unsaturated monomer with a sterically hindered isocyanate group, optionally with other ethylenically unsaturated monomer on top of the preformed seed particles to further enlarge the particle size and to form an outer surface layer comprising isocyanate groups thereon onto said bulk core; and
   c) completing the free radical addition reaction.

2. The method as described in claim 1 wherein said latex particle comprises a volume ratio of the core to the surface layer in a range from about 05:95 to about 99:1.

3. A structured reactive latex suitable for fiberglass sizing, said latex comprising particles having a bulk core surrounded by an outer surface layer;
   wherein the bulk core is free of isocyanates and prepared by semi-batch, starved process comprising the free radical addition polymerization of:
      i) at least one ethylenically unsaturated monomer free of isocyanates;
      ii) at least one emulsifying agent; and
      iii) at least one free radical initiator;
      to form a seed particle latex;
   wherein said surface layer comprises isocyanate groups and prepared by free radical polymerization comprising:
      iv) at least one ethylenically unsaturated monomer with a sterically hindered isocyanate group and; optionally
      v) at least one or more ethylenically unsaturated monomers;
   and the volume ratio of said bulk core to said surface layer is in a range of from about 5:95 to about 99:1.

4. The method as described in claim 1, wherein said latex particle is formed at a temperature in a range of from about 5° C. to about 80° C.

5. The method as described in claim 1, wherein said latex particle is formed using a one-stage seed emulsion polymerization.

6. The structured reactive latex as described in claim 3, wherein the volume ratio of the bulk core to the surface layer is in a range of from about 50:50 to about 99:1.

7. The structured reactive latex as described in claim 3, wherein said monomer is selected from the group consisting of $C_{1-8}$ alkyl acrylates, $C_{1-8}$ alkyl methacrylates, styrene, acrylonitrile, vinylacetate and mixtures thereof.

8. The structured reactive latex as described in claim 3, wherein said emulsifying agent is selected from the group consisting of ionic emulsifiers, nonionic emulsifiers and mixtures thereof.

9. The structured reactive latex as described in claim 3, wherein said emulsifying agent is present in a range of from about 0.5% by weight to about 5.0% by weight, based on the total monomer weight.

10. The structured reactive latex as described in claim 3, wherein said free radical initiator is selected from the group consisting of thermally activated initiators, redox initiators and mixtures thereof.

11. The structured reactive latex as described in claim 10, wherein said free radical initiator is selected from the group consisting of azonitriles, hydroperoxides, persulfates, salts of formaldehyde, sulfoxylate, bisulfite, erythorbic acid and mixture thereof.

12. The structured reactive latex as described in claim 3, wherein said free radical initiator is present in a range of from about 0.1% by weight to about 1.0% by weight, based on the total monomer weight.

13. The structured reactive latex as described in claim 3, wherein said ethylenically unsaturated monomer with a sterically hindered isocyanate group is selected from the group consisting of meta-isopropenyl-α,α-dimethylbenzylisocyanate, para-isopropenyl-α,α-dimethylbenzylisocyanate and mixtures thereof.

14. The structured reactive latex as described in claim 3, wherein said ethylenically unsaturated monomer with a sterically hindered isocyanate group is present in a range of from about 0.1% by weight to about 20.0% by weight, based on the total monomer weight.

15. The structured reactive latex as described in claim 3, wherein said particle ranges in size from about 0.1 microns to about 1 microns.

16. The structured reactive latex as described in claim 3, wherein said particles are present in a range of from about 40% by weight to about 50% by weight, based on the total weight of the structured reactive latex.

17. The structured reactive latex as described in claim 3, wherein said latex has a viscosity in a range of from about 20 centipoise to about 500 centipoise.

18. The structured reactive latex as described in claim 3, wherein said latex has a pH of from about 2 to about 5.

19. The structured reactive latex as described in claim 3, wherein said particle comprises a core and shell structure.

20. A fiberglass sizing composition comprising the structured reactive latex as described in claim 3.

21. The method as described in claim 1 wherein the latex particle is formed at a temperature range of from about 35° C. to about 80° C.

22. The method as described in claim 1 wherein the particle size of the latex particle is about 0.1 to about 1$\mu$.

23. A semi-batch, starved method for the preparation of a structured reactive latex particle comprising the steps of:
   a) providing an aqueous polymer pre-emulsion comprising bulk core particles being free of isocyanate groups wherein said emulsion comprises:
      i) at least one ethylenically unsaturated monomer free of isocyanates; and
      ii) at least one emulsifying agent;
   b) introducing an entire amount of at least one free radical initiator to a minor portion of the pre-emulsion in a reaction chamber;
   c) conducting the free radical polymerization at a suitable temperature;
   d) continuously feeding a major portion of the pre-emulsion to the reaction chamber;
   e) copolymerizing at least one ethylenically unsaturated monomer comprising a sterically hindered isocyanate with the remaining pre-emulsion and optionally, with at least one ethylenically unsaturated monomer; and
   f) completing the free radical polymerization;
   to form a structured reactive latex having a bulk core surrounded by an outer surface layer with isocyanate groups thereon onto said bulk core.

24. The method as described in claim 23 wherein a minor portion of the pre-emulsion is at least about 1% by weight of the total pre-emulsion and a major portion of the pre-emulsion is at least about 98% by weight of the total pre-emulsion.

* * * * *